United States Patent [19]

Becker

[11] E Re. 29,924

[45] Reissued Mar. 6, 1979

[54] THERMALLY INSULATING WALL UNITS

[76] Inventor: Otto A. Becker, Robert Koch Strasse 59, 66 Saarbruecken 6, Fed. Rep. of Germany

[21] Appl. No.: 843,080

[22] Filed: Oct. 17, 1977

Related U.S. Patent Documents

Reissue of:

[64] Patent No.: 3,929,186
Issued: Dec. 30, 1975
Appl. No.: 444,003
Filed: Feb. 20, 1974

U.S. Applications:

[63] Continuation of Ser. No. 37,068, May 13, 1970, abandoned.

[30] Foreign Application Priority Data

| | | | |
|---|---|---|---|
| May 13, 1969 | [DE] | Fed. Rep. of Germany | 1924313 |
| May 21, 1969 | [DE] | Fed. Rep. of Germany | 1925789 |
| Jun. 25, 1969 | [DE] | Fed. Rep. of Germany | 1932202 |
| Jul. 22, 1969 | [DE] | Fed. Rep. of Germany | 1937086 |
| Aug. 14, 1969 | [DE] | Fed. Rep. of Germany | 1941401 |
| Aug. 23, 1969 | [DE] | Fed. Rep. of Germany | 1943042 |

[51] Int. Cl.[2] ..... F24H 9/08

[52] U.S. Cl. ..... 165/49; 52/172; 98/31

[58] Field of Search ..... 165/49, 81, 96, 107, 165/135, 146; 62/DIG. 13; 98/31; 52/171, 172, 173, 305, 408, 456

[56] References Cited

U.S. PATENT DOCUMENTS

| | | | |
|---|---|---|---|
| 1,852,661 | 4/1932 | Larkin | 52/171 |
| 2,015,808 | 10/1935 | Miller et al. | 52/171 |
| 2,083,622 | 6/1937 | Summers | 52/171 |
| 2,122,209 | 6/1938 | MacMaster | 52/171 |
| 3,048,375 | 8/1962 | Walker | 165/49 |
| 3,192,575 | 7/1965 | Rosenau, Jr. et al. | 52/171 |
| 3,356,824 | 12/1967 | Rossetti | 52/171 |
| 3,410,336 | 12/1968 | Eisler | 165/49 X |
| 3,490,718 | 1/1970 | Vary | 165/107 X |

FOREIGN PATENT DOCUMENTS

| | | | |
|---|---|---|---|
| 1038204 | 9/1953 | France | 165/49 |
| 119614 | 10/1917 | United Kingdom | 165/49 |

*Primary Examiner*—Charles J. Myhre
*Assistant Examiner*—Margaret LaTulip
*Attorney, Agent, or Firm*—Donald D. Jeffery

[57] ABSTRACT

A wall unit comprising oppositely disposed panels defining a cavity between them, the cavity containing insulating means and being filled with dry air or other dry gas, for example nitrogen, the cavity being connected to a volume compensation device for the air or gas.

12 Claims, 32 Drawing Figures

Fig.22
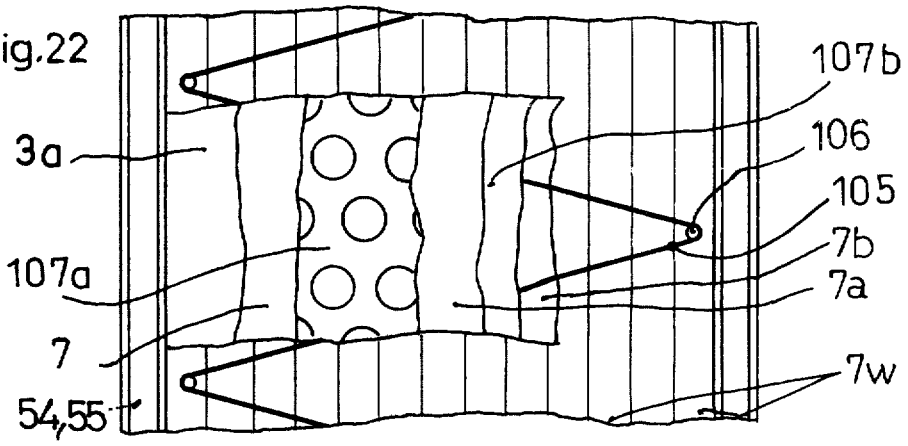
Fig.23
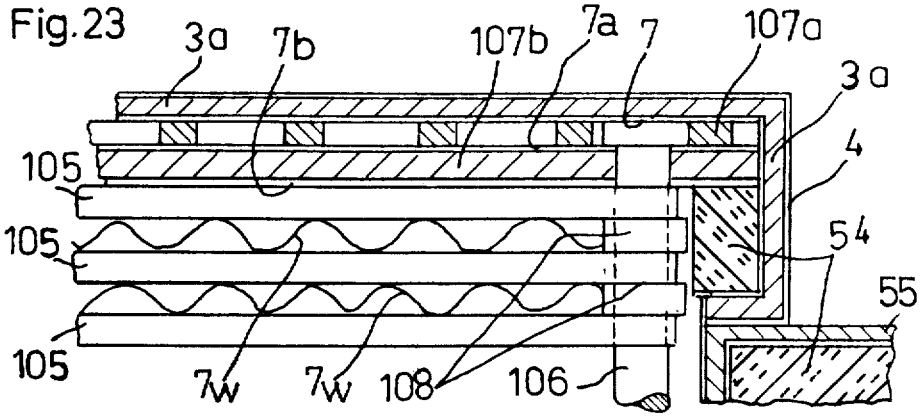
Fig.24
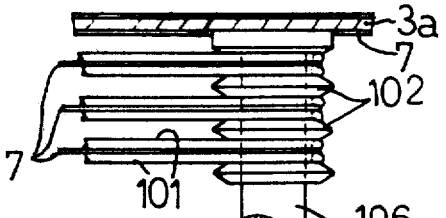
Fig.25
Fig.26
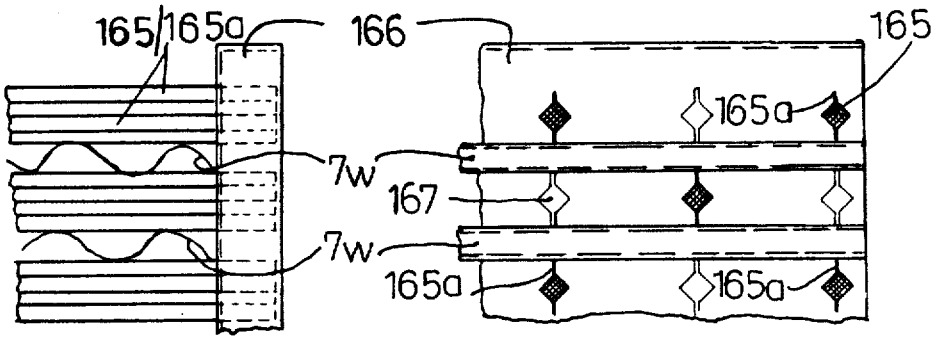

Fig.27
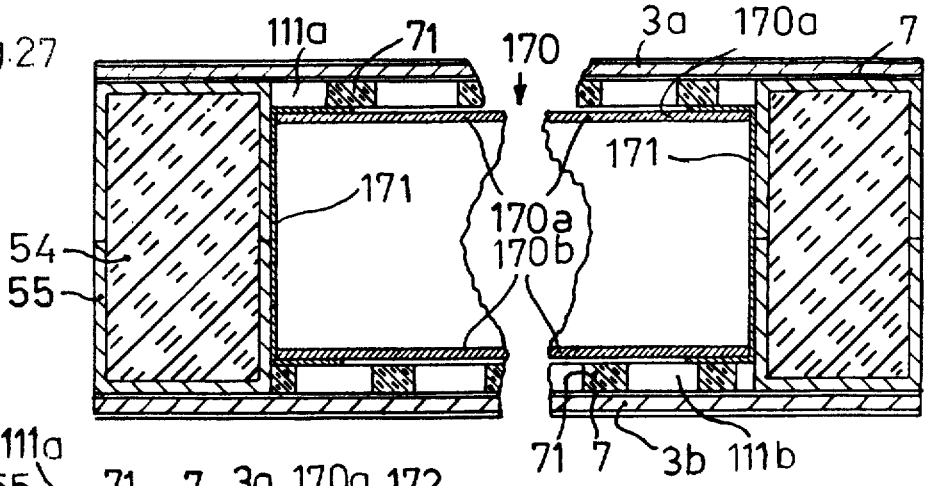
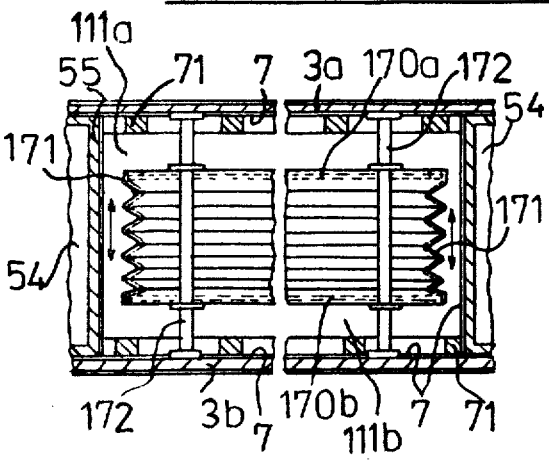
Fig. 28
Fig.29
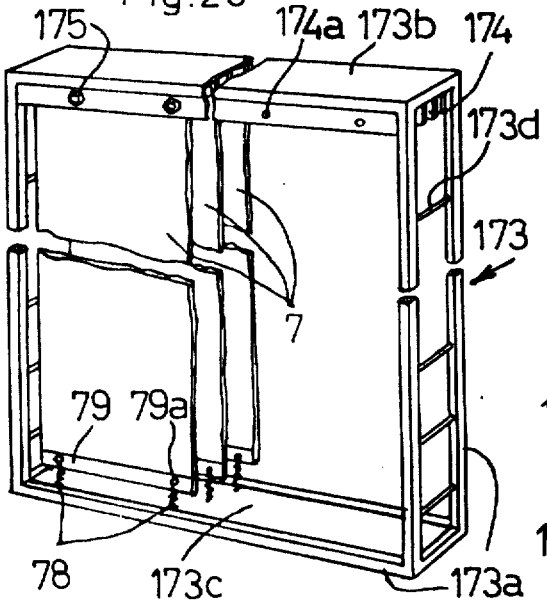
Fig.30
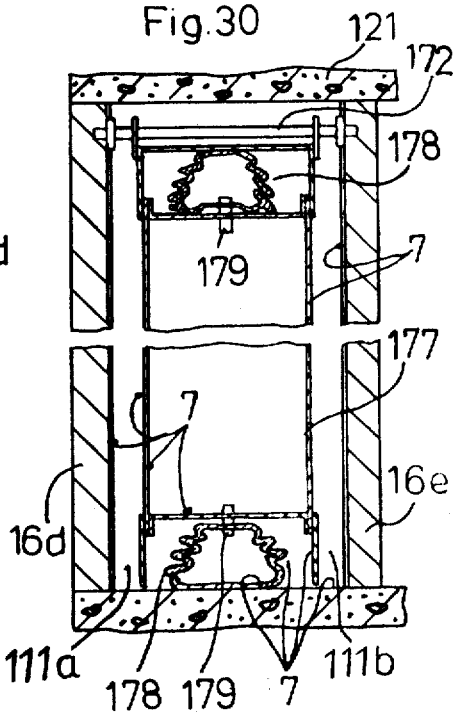

THERMALLY INSULATING WALL UNITS

Matter enclosed in heavy brackets [ ] appears in the original patent but forms no part of this reissue specification; matter printed in italics indicates the additions made by reissue.

This is a continuation of application Ser. No. 37,068, filed May 13, 1970 which is now abandoned.

BACKGROUND OF THE INVENTION

The present invention relates to a wall unit with thermal and accoustic insulation.

A known wall unit of this kind is constructed as a composite panel for external walls. It consists of an external layer of plastics coated sheet metal, thermal insulation in the form of compression resistant foamed plastics and an inner layer which is connected with the outer layer by means of a frame. In order to make the composite panel permeable to vapour, the outer layer is provided with vertical cuts for the purpose venting and behind each cut a vapour permeable filling strip is arranged, the inner layer being made of vapour permeable material e.g. in the form of a plaster board. As a result of this, the depositing of moisture inside the composite panel or on the side of the inner layer facing the cavity is avoided, this being in accordance with German Pat. Specification No. 1121304.

Another known wall unit for external walls comprises two sheet metal panels of equal size and with angularly folded margins. The sheet metal panels engage around sealing strips by means of their margins, and are connected together by means of an insulating plate bonded between them, this being in accordance with German Pat. specification No. 1 241 085.

Since on heating or cooling, the air enclosed in the wall unit expands or contracts, forces exist between the opposite walls of the panel, and moreover, the moisture which is contained in the air in the wall unit is deposited on the walls when a drop in temperature occurs, resulting in damage to the insulation and giving rise to rusting. Moreover, in this construction the insulating effect is not high.

Essentially better insulating effects can be achieved with the use of reflecting metal foils. They enable an effective thermal protection but form an air and moisture-tight closure. On cooling down of the wall unit, moisture is deposited on the foils incorporated in the wall unit, so that their insulating action is considerably reduced and the moisture gradually reaches other regions of the wall unit. In this respect, reference is made to German patent specifications Nos. 870 751 and 706 545.

The present invention has the object of improving the thermal and accoustic insulation of wall units avoiding the depositing of moisture in them, and avoiding the production of forces between the walls of the wall unit with a change in ambient temperature.

BRIEF SUMMARY OF THE INVENTION

In a wall unit according to the present invention, consisting of an outer panel and an inner panel airtightly connected with it, and insulation accommodated in the cavity between the said panels, the cavity of the wall unit is filled with dry air or other dry gas, for example nitrogen, and is provided with a volume compensating device for the air or gas, so that it is always in a pressure-less condition. The cavity of at least one wall unit may be connected with a flexible airtight envelope. The cavities of a plurality of wall units may be connected by transverse pipes and by a common line to a common volume compensating device.

The cavity may be connected with a volume compensating device through an air drying installation. According to another solution, the cavity may be connected to the atmosphere, through an air drying installation, a dust filter and a suitable opening.

In accordance with another embodiment, the dry air present in the cavities may be placed into circulation through an air dryer and a filter by means of an air pump. Advantageously, the circulation path also includes a heating device or cooling device and a volume compensating device. For greater reliability, the circulation may be effected slightly above or slightly below atmospheric pressure.

For simplifying the guiding of the dry air, the collecting lines may be disposed in the wall units. The cavities of the wall units may themselves be constructed as air channels. Advantageously, directly in front of the separating wall, an air channel extending from the bottom to the top may be provided as a supply line, and in the uppermost wall unit a bypass channel may be provided, as well as a channel extending from the top to the bottom behind the outer wall, serving as a take-off line. For forming the air channels, the outer walls may comprise vertically directed ribs the spacing members may be vertically arranged and corrugated reflecting foils may be used with their vertical corrugations superimposed.

The outer panels may be airtightly built together to form a wall suspended from the building; and an inner wall unit with insulation may be arranged at a spacing therefrom forming an outer air channel, and the inner wall may again be arranged at a spacing, forming an inner air channel.

For air conditioning the rooms from the outer walls, water conditioners, e.g. in the form of square tubular pipes may be arranged on the inner wall of the wall unit, for the supply or removal of large amounts of heat through the inner wall. The water containers simultaneously serve for strengthening and holding the inner wall so that the reflecting foil insulation may be mounted directly between the floor and the ceiling and the intermediate chambers formed by bores in the cover and base may be constructed as air channels. For partition walls in the interior of the building, an inner wall unit may be provided between two walls, with the formation in each case of an air channel, which is filled with dry air and provided with a volume compensating device. The air channels may be connected by an air circulation system to an air conditioning installation, preferably using dry air, and may serve for air conditioning the walls and the rooms lying therebeyond.

The insulation may consist of reflecting foils arranged at a spacing, the spacing being maintained by perforated foam plastics plates. The reflecting coils may alternatively be fixed only at their margins to hard plastics foam rails, and held by means of tension springs. The cavity between the reflecting foils may be sub-divided into chambers by a number of narrow perforated strips of hard foam plastics, the strips on one side of the reflecting foil being horizontal and those on the other side vertical. The reflecting foils may be strengthened by the provision of corrugations and inserted into the chambers with the interposition of spacing members. Foils with large corrugations may be held between tensioned bands or cords which are arranged in a zigzag manner.

The volume in the wall elements which has to be kept filled with dry air or other dry gas, for example nitrogen, can be essentially reduced by the insertion of insulating elements which themselves are airtightly closed. This can consist of an air and vapour-tight flexible envelope of plastics which is stiffened by two plates lying parallel to the panels, filling the cavity of the wall unit parallel to the walls and being filled with dry air. The volume compensation can be obtained by changing the spacing of the plates and by a bellows-like construction of the envelope. Insulation, for example, frames with reflecting foils mounted on them, may be provided in the interior.

For enabling the use of very thin reflecting foils of aluminum, which are particularly suitable, marginal strengthening members, for example strips, may be provided for them. While the foil is being unrolled, its longitudinal marginal edges are bonded to self-adhesive strips and during cutting of the foil to size, its transverse marginal edges are bonded to such strips, the strips being drawn from rolls. The adhesive strips may be folded over the margins of the foil and may be provided with perforations for facilitating mounting of the foil.

BRIEF DESCRIPTION OF THE DRAWINGS

There follows a detailed description of the preferred embodiments to be read together with the accompanying drawings which are provided solely for purposes of illustration.

FIG. 22 is a partial elevation of a wall element, the panels being broken away, having corrugated foils and spacing members formed by strips which extend in a zigzag manner;

FIG. 23 is a horizontal sectional view through the wall unit of FIG. 22;

FIG. 24 illustrates a modification of the arrangement of FIG. 23;

FIG. 25 is a plan view of a portion of an insulating group consisting of corrugated reflecting foils held by spacing rods;

FIG. 26 is a vertical section of the arrangement shown in FIG. 25;

FIG. 27 is a horizontal section of a wall unit in which an insulating element which itself can be airtightly closed, is insertable;

FIG. 28 is a sectional view illustrating a modification of the arrangement of FIG. 27, using an airtight envelope formed as a bellows;

FIG. 29 is a perspective view of a frame for arranging the reflecting foils within a wall unit;

FIG. 30 is a vertical section through a wall unit having an insulating element with volume compensating envelopes connected to it;

DETAILED DESCRIPTION OF THE PREFERRED EMBODIMENTS

Figure 1:
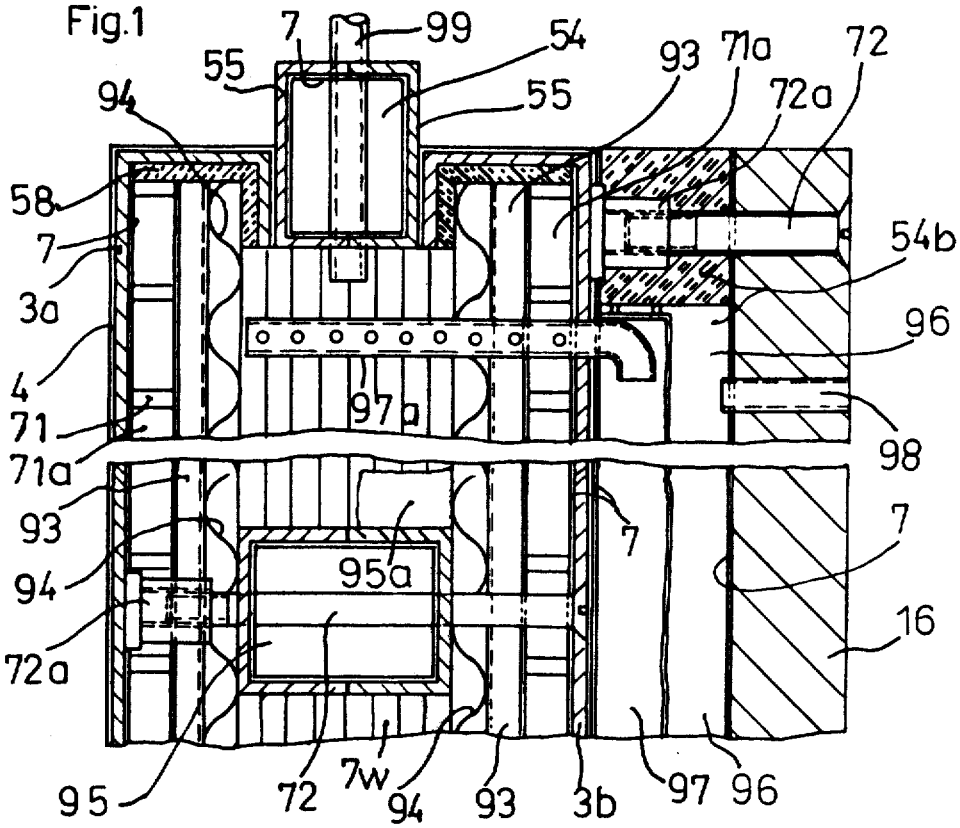
FIG. 1 is a vertical section through the upper part of a wall element, showing a volume compensation device.

In FIG. 1, the upper part of a wall unit is illustrated. As is customary, the wall unit extends downwardly to such an extent that it bridges the distance between the floor and ceiling of a storey of a building. The wall unit comprises an outer sheet metal panel 3a and an inner sheet metal panel 3b. Both of these are externally covered with a rust-protecting layer 4, for example in the form of a plastics layer, and their marginal regions are bent over in a U-shaped manner. Between the adjacent bent over regions of the sheet metal panels, rectangular plastics tubes 55 are inserted. These may extend out beyond the marginal regions of the panels, so as to enable connection with adjoining wall units. In their interiors, the tubes 55 are clad with reflecting foils 7 and they are filled with insulating strips 54, for example of plastics foam. For enabling exchange of air with the adjoining wall unit, a pipe 99 passes through the tube 55 and the insulating strip 54. The inner sides of the wall panels are covered with reflecting foils 7. The foils 7 are followed by a hard foam insulating plate 71 with perforations 71a, then a corrugated sheet 93 with vertically extending corrugations and a corrugated sheet 94 with horizontally extending corrugations, for stiffening the panels. The insulating plate and the corrugated sheets are terminated in the U-shaped marginal regions of the panels, and are insulated from the panels there, by means of an L-shaped insulating strip 58. In the middle, frames with horizontal limbs 95 and vertical limbs 95a are inserted, which are formed by rectangular plastics tubes. The tubes, which consist of two parts arranged together, surround insulating strips of glass fibre, glass foam, wood or hard foam, bonded in place. The space between the frames is filled with corrugated reflecting foils 7w and spacing means arranged between them. The sheet metal panels and the frame 95 are held together by screws 72 and welded on nuts 72a. Towards the building a reflecting foil 7 which extends around an insulating strip 54b, is provided on the inner panel 3b, for forming a cavity 96, and thereon, anaother reflecting foil 7 and a plate 16 of plaster, wood or the like, is fixed with screws 72 and welded on nuts 72a. In the cavity 96, an airtight and vapourtight flexible air envelope 97, for example formed by plastics sheets vapour coated on both sides with aluminum, is suspended, which is connected with the interior of the well unit by means of a pipe 97a. A pipe 98 furthermore extends from the cavity into the air in the room, or to the atmosphere. The wall unit and the air envelope are filled with dry air so that a deposit of moisture onto the reflecting foils covering the inner sides of the sheet metal panels or onto other parts cannot occur, and the reflecting foils do not lose their excellent reflecting characteristics. If the temperature of the dry air enclosed in the wall unit and in the air envelope alters, then its volume also alters and dry air passes through the pipe 97a into or out of the air envelope 97. The wall unit thus remains always without pressure and can be constructed lighter.

Figure 2:
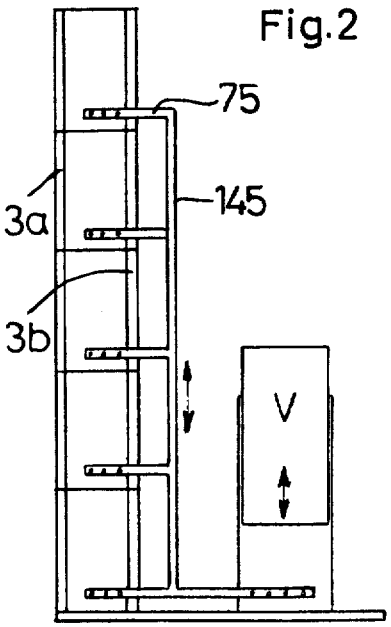
FIG. 2 diagrammatically illustrates a plurality of wall units of a building, arranged above the other, with a common volume compensating device.

The volume compensating device can be constructed in another manner and provided at other regions, and may be in the form of a single device for a plurality of wall units. In FIG. 2, the wall units of a plurality of building storeys lying one above the other are diagrammatically illustrated by their outer panels 3a and their inner panels 3b. In front of each wall unit, a horizontal pipe 75 is shown which leads to a collecting line 145 and to a volume compensating device V which is diagrammatically illustrated in the form of a cylinder and piston arrangement, and which may be provided in an adjoining room.

Figure 3:
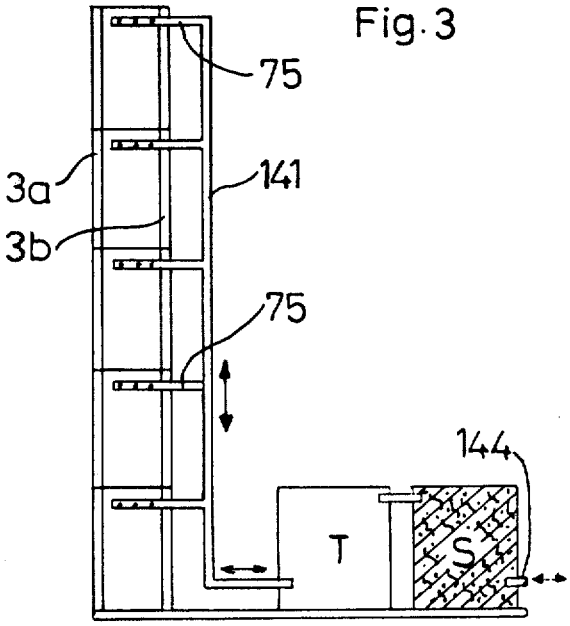
FIG. 3 is a diagrammatic sectional view through similar to FIG. 2, showing a volume compensating device venting to the atmosphere.

Another possibility for obtaining a dry air filling which is without pressure, is illustrated in FIG. 3. A plurality of wall units arranged one above the other, are illustrated by their outer panels 3a and their inner panels 3b. In front of each wall unit, a horizontal pipe 75 is shown which is in the vicinity of the upper end of each wall unit and which leads to a collecting line 141 which leads to an air drying device T and a dust filter S which has an opening 144 to the atmosphere. If the temperature of the dry air in the wall units drops, and the air consequently decreases in volume, then air is drawn in from the atmosphere through the dust filter and the air drying device. If the volume of the dry air increases then dry air passes out through the opening 144 to the atmosphere.

Figure 4:
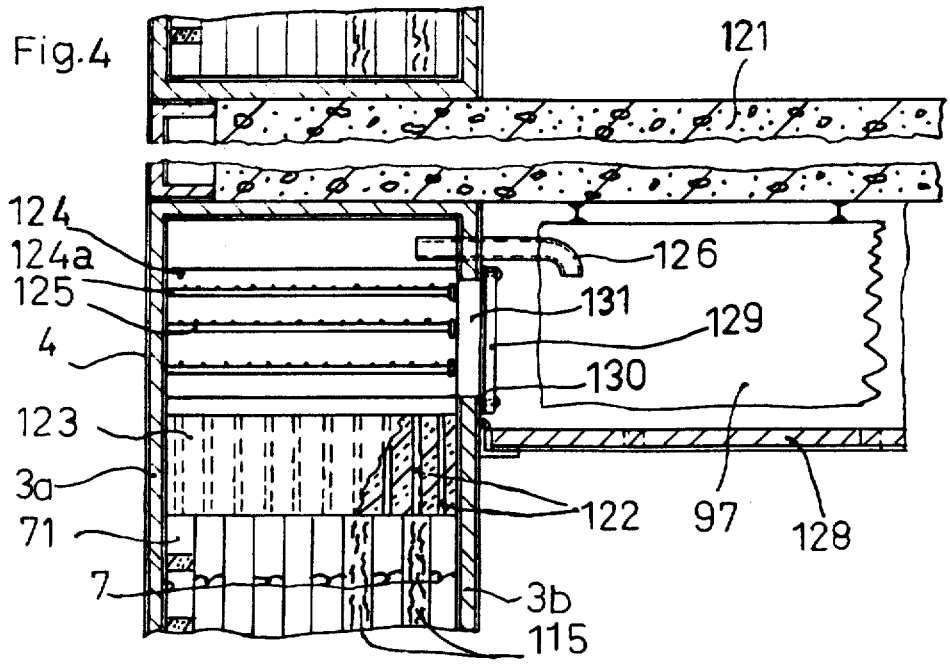
FIG. 4 is a vertical section through a wall unit, showing an air dryer and a volume compensating device.

FIG. 4 shows an embodiment using an air drying device which is provided in a wall unit. Below a storey ceiling 121 a wall unit is provided having an outer sheet metal panel 3a and an inner sheet metal panel 3b. The panels are externally covered with a layer 4, for example of plastics and are internally clad with reflecting foils 7. On the reflecting foil of the outer panel, a perforated insulating plate 110 is disposed. This is followed by a plurality of reflecting foils 7 with spacing members, which are arranged in front of the inner panel, in the form of asbestos plates 115, for the purposes of fire protection. At least the upper marginal insulating strip 123 is provided with vertical bores 122 for the passage of air. An air dryer 124 is built into the upper part of the wall unit. It consists of a frame 124a with filters 125 covered with hygroscopic substances, for example calcium chloride. For maintenance, an opening 131 is provided in the inner panel 3b, which can be airtightly closed by means of a closure plate 129 and a seal 130. A hygroscope which is inserted, can be observed through a glass window, and the water content of the air can thus be monitored. The water vapour rising upwardly is abosrbed in the air dryer. Furthermore, above the dryer, a pipe 126 is provided, which leads to a volume compensating device, for example a flexible airtight envelope 127 of plastics sheet or of a resiliently deformable material. The envelope is provided below a storey ceiling 121 and above an intermediate ceiling 128. If the volume of the air present in the wall unit changes, then compensation is effected by contraction or expansion of the envelope. The compensation air has to flow through the dryer so that the wall unit is always full of dry air and at the same time is without pressure.

Figure 5:
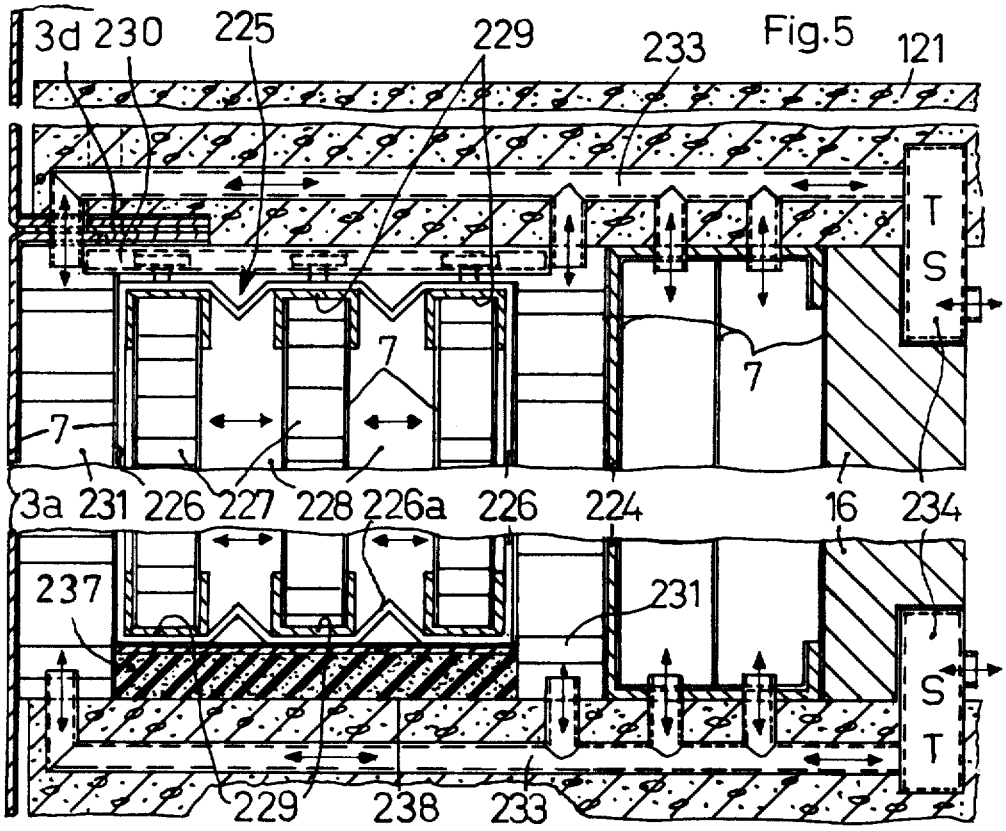
FIG. 5 is a vertical section through a wall unit, showing an air dryer, a dust filter and an opening leading to the atmosphere.

In another arrangement, the air drying device may be built onto the wall unit as shown in FIG. 5, and provided with an opening leading to the atmosphere. The wall unit extends between two storey ceilings 121, the panel 3a being on the outside of the building. The margins of the panel 3a are provided with bent over regions 3d which are fixed together with the bent over regions of adjoining wall units, from underneath onto the storey ceiling. The inside of the panel 3a is clad with a reflecting foil 7. This is followed by a resilient plastics foam mat 231, and a variable volume insulating element 226, filled with dry air. The insulating element consists of a flexible airtight envelope for example of plastics with metallised reflecting surfaces, and contains in its interior an arrangement of spacedly disposed honeycomb plates 227 which are covered with reflecting foils 7 and which are provided at their upper and lower ends with U-shaped clamping rails 229. In the cavities 228 between the honeycomb plates 227, the envelope forms folds 226a so that the enclosed air can expand or contract, whereby the insulating element remains without pressure. In order to facilitate the movement, the envelope is suspended at its top on guide means 230 so as to be slidable thereon, and is mounted at its bottom on a slide plate 238 arranged on a resilient plastics strip 237. The envelope is followed by a further soft plastics foam mat 231 and an insulating chamber which consists of a separating wall 225 having U-shaped angularly bent regions at its margins, and finally a wall plate 16 lying against this further insulating chamber. The separating wall is provided on both sides with reflecting foils. If desired, the further insulating chamber may be sub-divided by further reflecting foils. For compensation of the air, the cavities which contain the foam mats and the cavities of the insulating chamber are connected both above and below to pipes 233 and by means of these pipes are connected to air filtering and drying devices 234 which open to the atmosphere. The devices 234 comprise air dryers T and dust filters S of elongated strip-like construction and these are exchangeably provided at the upper and lower marginal regions of the wall plate. After the wall unit has been filled with dry purified air, only dry and purified air can flow into or out of the wall unit.

Figure 6:
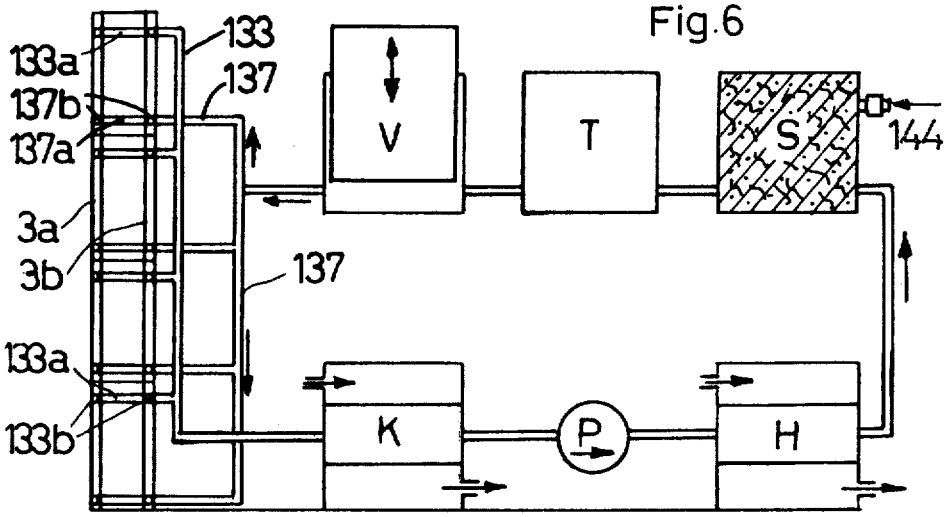
FIG. 6 is a diagrammatic sectional view of a plurality of wall units arranged one above the other, connected to a circulation pump, an air conditioning installation and a volume compensating device.

It is even more reliable, if the depositing of moisture which occurs on cooling down, is prevented by circulating dry air in the wall units. In FIG. 6, the individual wall units are illustrated by their outer panels 3a and their inner panels 3b. The cavities of the wall units are connected at their lower regions by transverse pipes 137a with openings 137b, to a common supply line 137, and at the upper regions by transverse pipes 133a with openings 133b, to a common take-off line 133. The take-off line leads to a circulating pump P, a dust filter S, a dryer T, a volume compensating device V and back to the common supply line 137, so that the path of circulation is closed.

Preferably, this circulation can also be used for performing a temperature conditioning of the wall units, that is to say heating or cooling them according to requirements. For this purpose, a cooling device K and a heating device H with thermostat control is additionally provided in the circulation path of the dry air. Furthermore, the dust filter has an opening 144 leading to the atmosphere, in order to be able to make up for losses of dry air. The conditioning prevents the depositing of moisture and facilitates the conditioning of the interior of the building.

Figure 7:
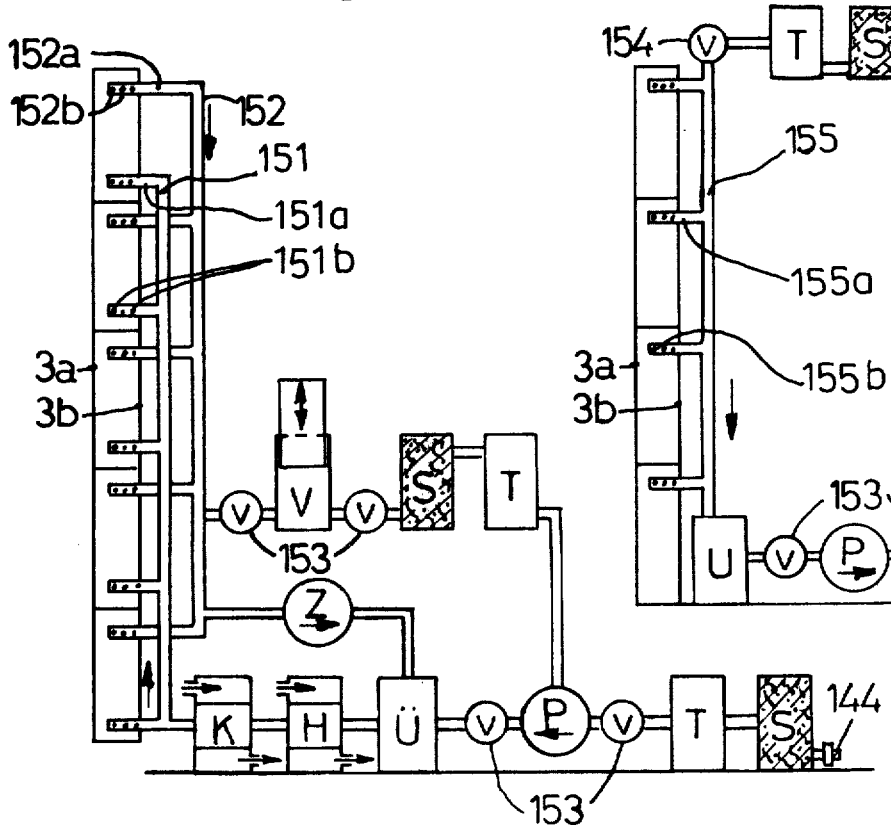
FIG. 7 diagrammatically illustrates an arrangement similar to the arrangement of FIG. 6, but designed for operating at a pressure slightly above atmospheric.

In the arrangement shown in FIG. 7 and an air conditioning installation is shown in association with a group of wall units, the installation being operated at a pressure slightly above atmosphere so as to prevent the entry of water vapour. The wall units are illustrated by means of their panels 3a and 3b. Their individual air cavities are connected at their lower regions by transverse pipes 151a with openings 151b, to a common supply line 151, and at their upper regions by transverse pipes 152a with openings 152b, to a common take-off line 152. The take-off line leads through a circulation pump Z, a pressure vessel U, a heating device H, a cooling device K and back to the common supply line 151. By means of thermostats, the heating and cooling devices can be switched on and off so that by means of the circulation, uniformly conditioned air may be obtained. If the pressure drops, then an air pump P is automatically actuated. The pump is arranged with valves 153 in an auxiliary circulation path which branches from the take-off line 152 and extends through a volume compensating device V with valves 153, a dust filter S, a drying device P and through the air pump P back to the pressure vessel U. If the contents of the volume compensating device are at any time insufficient, then the air pump draws air in through a dryer T, a dust filter S, and an opening 144, from the atmosphere. If a pressure increase takes place as a result of an increase in temperature, then the valve between the line 152 and the volume compensating device V opens and the device V is again filled from within the circuit.

Figure 8:
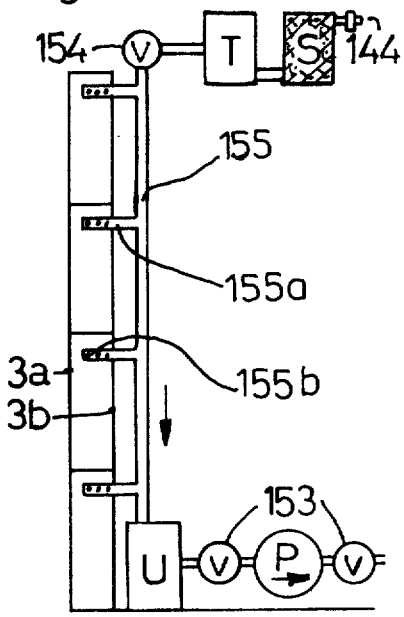
FIG. 8 diagrammatically illustrates an arrangement similar to the arrangement of FIG. 7, but arranged for operating at a pressure slightly below atmospheric.

In the arrangement of FIG. 8, the wall units are arranged under a pressure slightly above atmospheric pressure. The individual wall units are illustrated by their panels 3a and 3b. Their cavities are connected at their upper regions through transverse pipes 155a with openings 155b to a collecting line 155. The line 155 can draw air in from the atmosphere at its upper end, through a valve 154, a drying device T, a dust filter S and an opening 144, and at its lower end the line 155 is connected to a vessel U which is maintained at a pressure below atmospheric pressure, by means of a suction pump P having valves 153.

Figure 9:
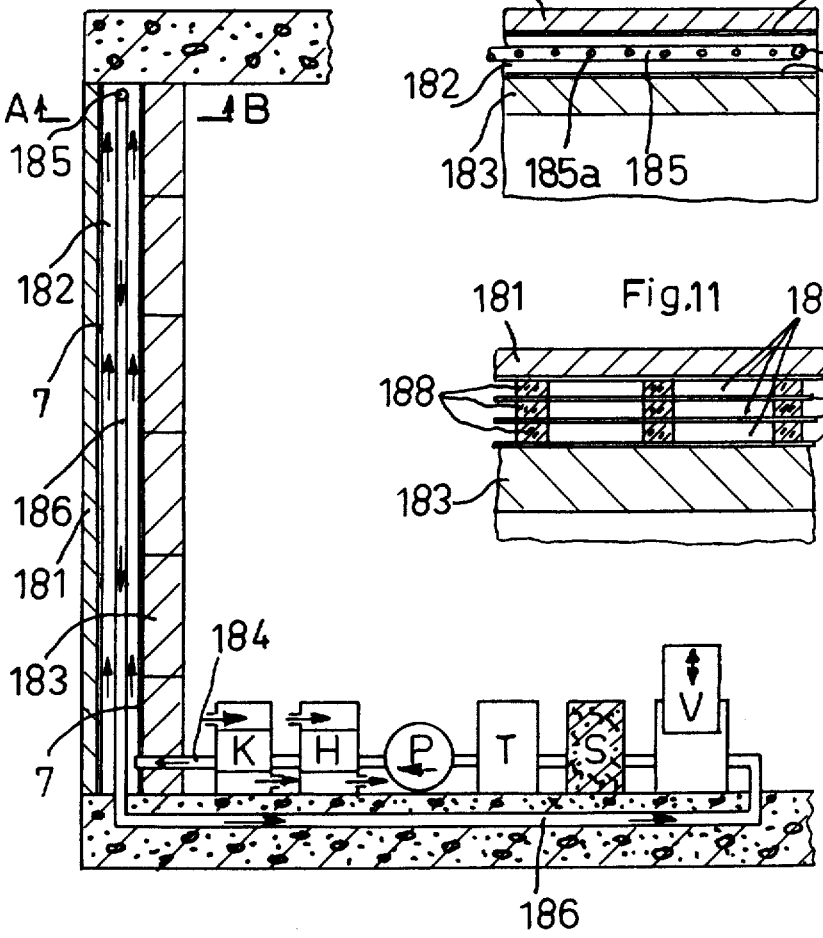
FIG. 9 illustrates the use of collecting lines disposed within the wall units.
Figure 10:
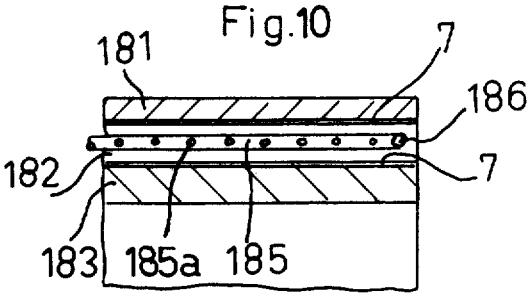
FIG. 10 is a sectional view taken along the line A–B of FIG. 9.

For simplification, the construction may be as shown in FIGS. 9 and 10, in which the externally lying panels are connected to an outer wall 181 and behind it an air gap 182 extending through all storeys is arranged, the rearward side of which is formed by inner wall units 183 which are insulated and which are of storey height. The walls facing the air gap are clad with reflecting foils 7 and are airtightly and vapour-tightly closed. In the air gap, vertical pipes 186 are arranged the upper ends of which are connected by a horizontal pipe 185 with openings 185a. The vertical pipes extend downwardly to a volume compensating device V, a dust filter S, a drying device T, a circulating pump P, a heating device H, a cooling device X and then back through a pipe 184 into a lower region of the air gap. The external wall, at which the largest temperature differences occur, and on which the heaviest deposit of moisture is to be expected, can thus be intensively flushed with air, and temperature-conditioned, if desired with thermostat control.

Figure 11:
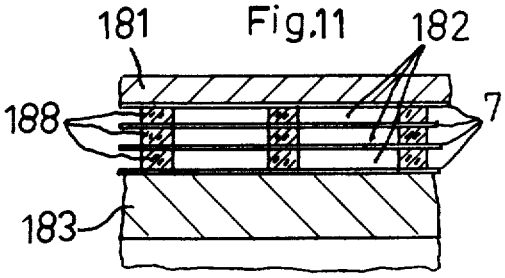
FIG. 11 is a view similar to FIG. 10, showing a modification thereof.

The air gap 182 may also be used for insulation, as shown in FIG. 11. As well as the reflecting foils on the walls bordering the air gap, further reflecting foils 7 are arranged parallel to the outer wall and are held by vertical spacings members 188 in the form of hard foam strips, which may be adhesively bonded to the foils.

Figure 12:
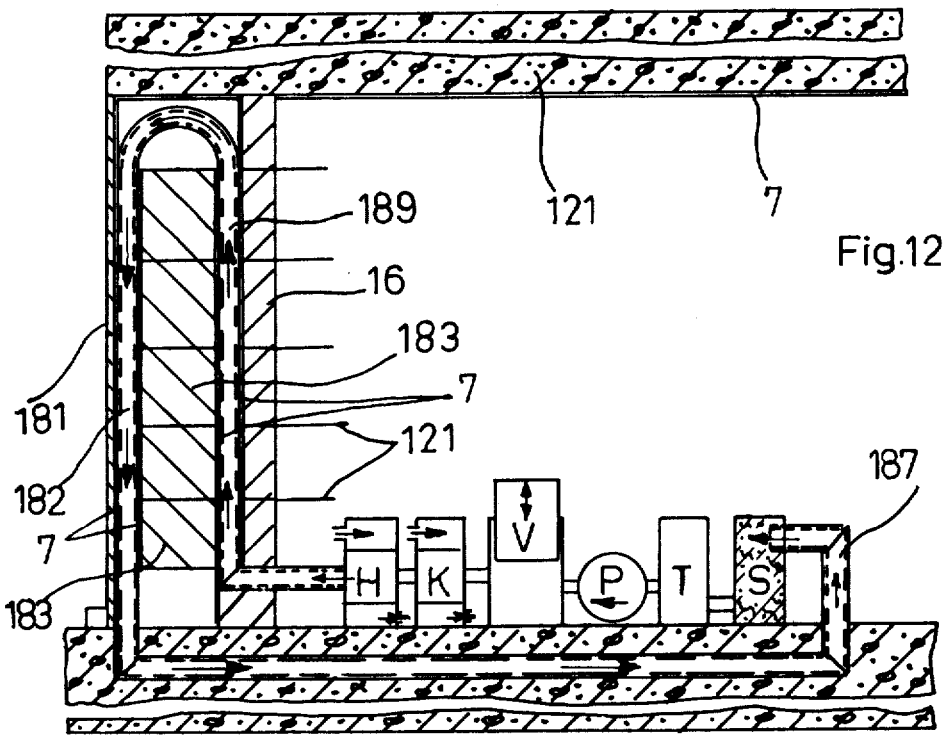
FIG. 12 illustrates an arrangement using air channels disposed within the wall units.

FIG. 12 illustrates a manner of obtaining effective guidance of the air in a very simple way. The suspended outer wall panel 181 covers the individual storey region, which is shown in the drawing by the storey ceilings 121. Behind the outer wall panel, air gaps 182 are arranged, the boundary walls of which are clad with reflecting foils 7. These are followed by inner wall elements 183 and a second air gap 189 the boundary walls of which are likewise clad with reflecting foils 7. The inner wall is formed by a structural plate 16. The air flows up through the air gap bordering the inner wall, is deflected at the top of the uppermost wall unit to the outwardly lying air gap 182, as diagrammatically shown in FIG. 12 by a curved region, and then flows down through the outer air gap into a line provided in the floor, and then through a pipe 186 to a dust filter S, a dryer T, a circulating pump P, a volume compensating device V, a cooling device K, and a heating device H, from which the air is again fed through a line into the air gap lying adjacent the plate 16.

Figure 13:
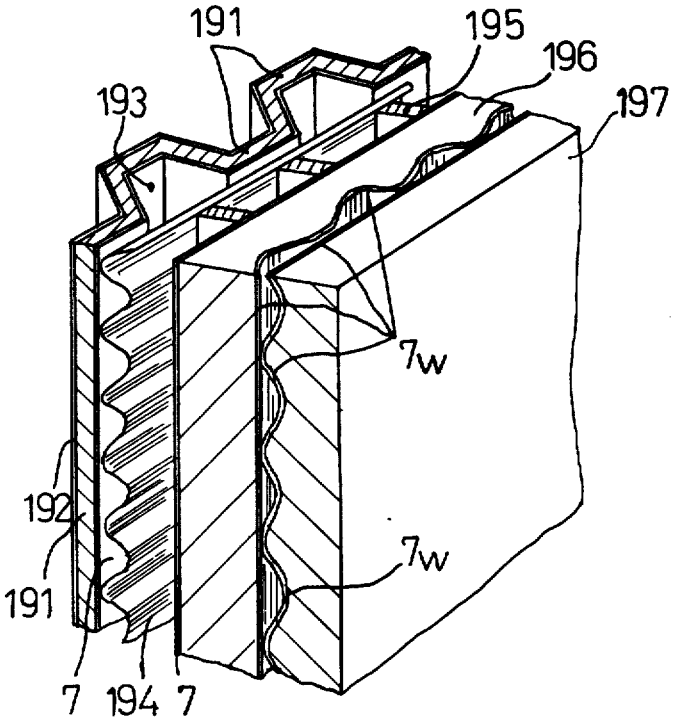
FIG. 13 is a perspective view of a wall unit having a plurality of air channels.

In the arrangement shown in FIG. 13, the outer panel is in the form of a metal wall 191 with vertically extending reinforcing ribs, for example trapezium-shaped in cross-section, which form air channels extending continuously from the top to the bottom of the panel. On the outside, the panel is clad with a layer 192 and on its inside with a reflecting foil 7. An aluminum sheet 194 which is highly reflecting on both sides and which has horizontally disposed corrugations abuts against the inside of the panel 191. This corrugated sheet is followed by vertically disposed spacing members 195, for example of hard foam plastics, which form vertical air gaps, a reflecting foil 7 and a structural plate 196. The rear of the plate 196 is vertically corrugated and clad with a similarly corrugated reflecting foil 7w. The corrugations form further vertical air gaps. The foil 7w is followed by a structural plate 197 which is constructed in a manner similar to the plate 196 but which has horizontally extending corrugations. The vertical air gaps are connected with the dry air circulation system described above.

Figure 14:
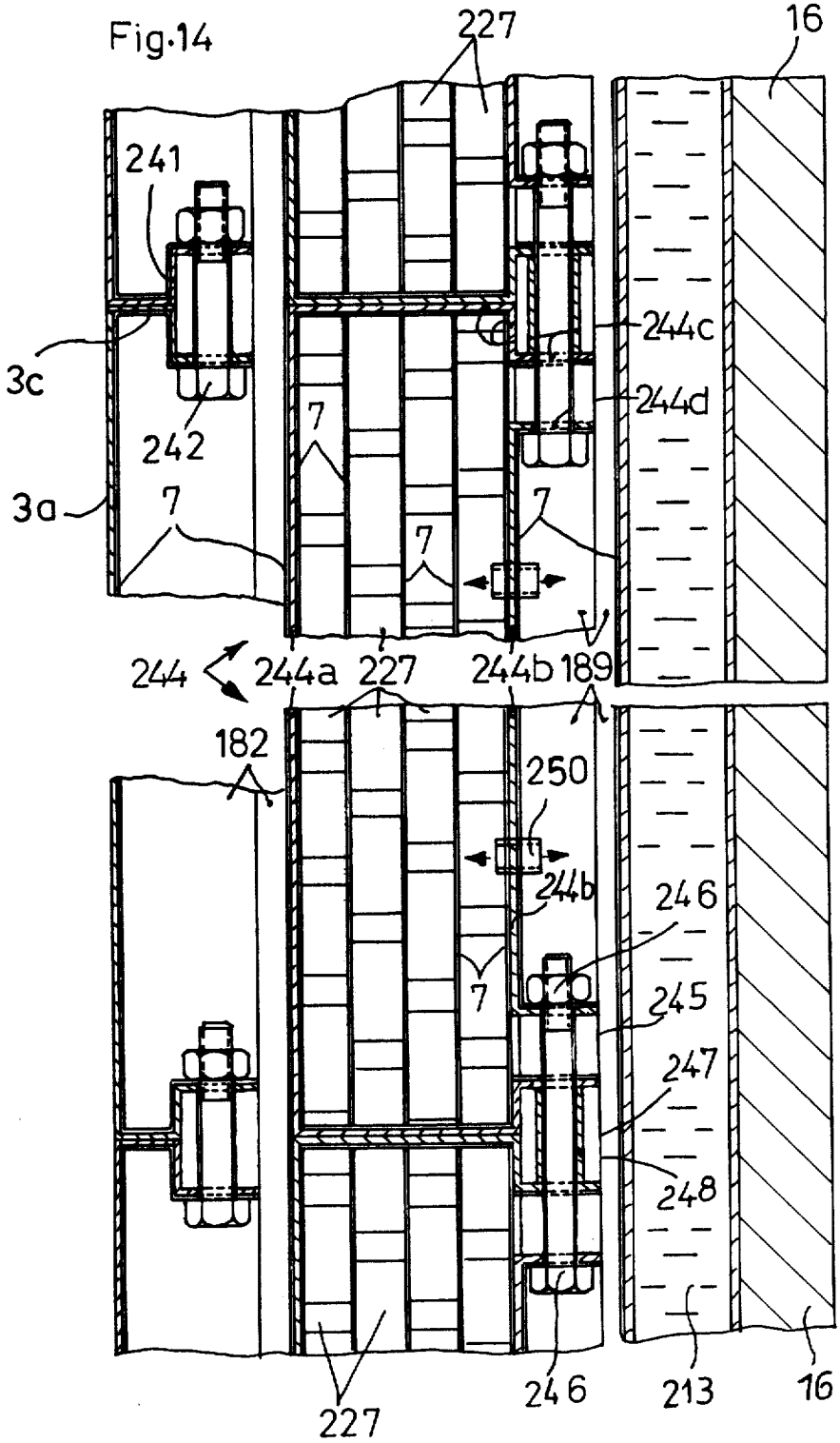
FIG. 14 is a sectional view through a wall unit having an outer and an inner channel, formed by an inner insulating element, and having a water container for conditioning the inner wall.

A simple construction of the wall units for enabling air to be guided in the manner described with reference to FIG. 13 is illustrated in FIG. 14. The outer panels 3a are provided on their margins with Z-shaped re-entrant formation 3c. The marginal formations of two panels engage around sealing strips 241 and are held together by screws 242 so that an airtight wall hanging in front of the building results. The panels 3a are followed by an outer air gap 182 extending from the bottom to the top, and an inner wall unit 244. This consists of an outer wall panel 244a with Z-shaped marginal regions 244c, an inner wall panel 244b with singly folded marginal regions 244d and reflecting foils 7 with spacing means, for example honeycomb plates 227 of plastics foam or paper between them. Between the angled marginal regions of the inner and outer wall panels, sealing strips 245 are inserted, and insulating strips with spacing sleeves 248 are provided between adjacent units, all parts being held together by screws 246. For pressure equalisation, pipes 250 may extend through the inner wall panel. The panels of the inner wall units may consist of metal, wood, plastics, asbestos cement or foamed concrete. These are followed by an air gap 189 extending continuously from the bottom to the top, a water container 213 and the inner wall 16. The walls bordering the air gaps are clad with reflecting foils 7. The heating and cooling vessel lies directly against the wall 16 in order to have good thermal contact, but on the other side it is clad with reflecting foil in order to avoid radiation towards the outside of the building. The outer air gap and the inner air gap are connected by means of their lower ends to a circulation device for dry or conditioned air, in a manner similar to that described for the embodiment of FIG. 12.

Figure 15:
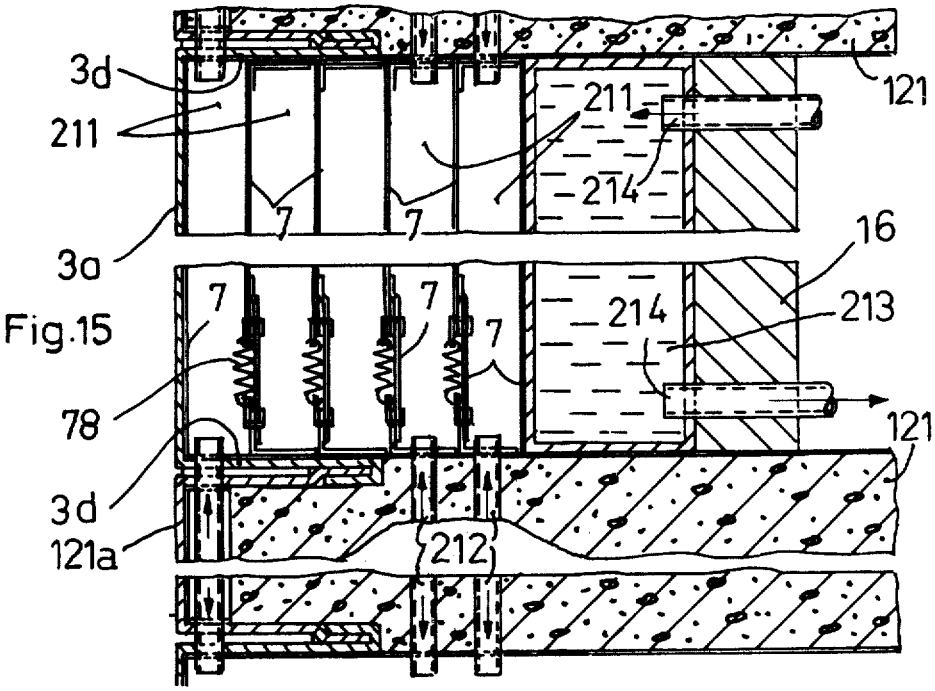
FIG. 15 is a sectional view of a wall element, having air channels arranged between reflecting foils and having means for conditioning the inner wall by the circulation of water.

For supporting the inner wall panels of the wall units, narrow water containers or sinuous pipes may be provided for effecting a thermal transfer mainly with the inner wall and the interior of the building, and for contributing to the temperature conditioning of the rooms of the building. Such a wall unit is illustrated in a vertical section in FIG. 15. The wall unit comprises an outer panel 3a which is provided with inwardly folded marginal regions 3d. The ends of the inwardly folded marginal regions are folded back again so as to form airtight connections with adjoining wall panels 3a or with facade elements 121a. The inner sides of the panels are clad with reflecting foils 7. These are followed at a spacing of about 10 mm by further reflecting foils which are fixed to the ceiling and the floor with the aid of marginal reinforcements and are tensioned by attached springs 78. The intermediate space between the panel and the first foil and the intermediate spaces adjoining the last foil may be constructed as continuous air gaps 211 by building pipes 212 into the storey ceiling 121. The last foil is followed by a rectangular vertically standing water container 213, the heating and cooling water of which is placed in circulation through the pipes 214. Outwardly, the water container is clad with reflecting foil, but inwardly it lies closely against the inner wall 16, for example constituted by a plaster plate. Due to the intimate contact of the water container with the inner wall 16, efficient thermal conduction occurs. However, transfer of heat at the other side of the water container is restricted by the reflecting foils with which the water container is clad on this side. The foils 7 which are tensioned by means of springs may if desired be perforated so as to enable equalisation of the air pressure in the various cavities bordered by the foils.

Figure 16:
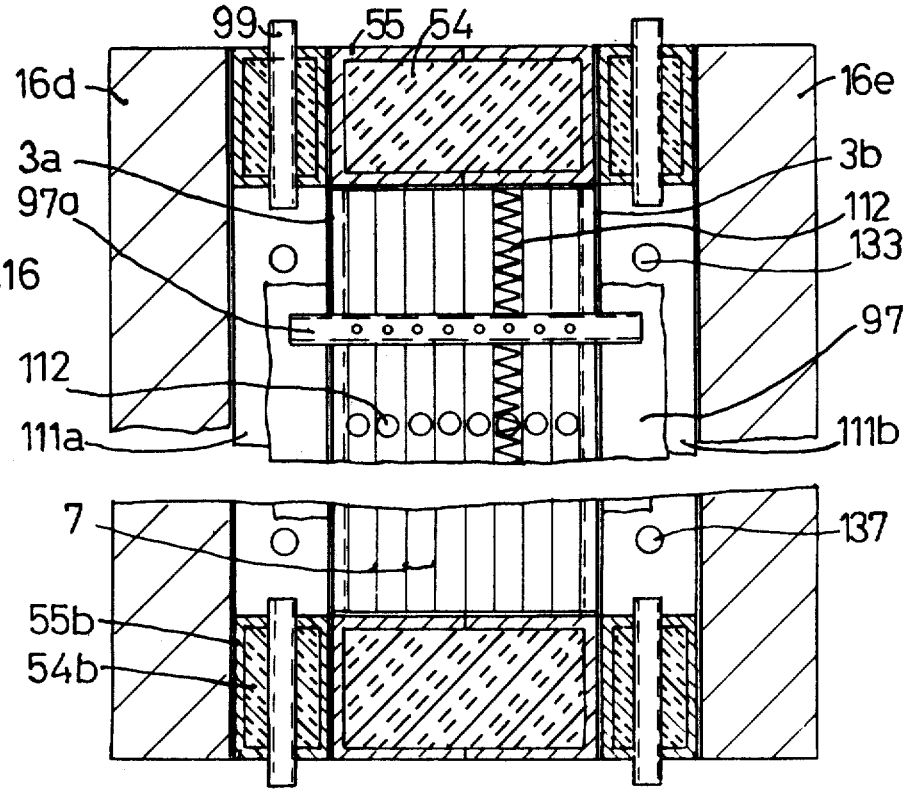
FIG. 16 is a sectional view of a wall element suitable for use as a partition in the interior of a building, and arranged for being temperature conditioned by means of circulation of air.

FIG. 16 shows an embodiment for a partition wall disposed inside a building. The partition wall consists of a left plaster plate 16d and a right plaster plate 16e. Marginal insulating strips 55b with insulation 54b are connected to them, through which connecting pipes 99 for adjacent walls extend. A wall unit is inserted between the marginal strips. It consists of a left hand panel 3a, a right hand panel 3b, a series of suspended reflecting foils 7 with spacing members provided between them in the form of helical springs 112 of plastics material which are arranged horizontally and vertically so as to intersect each other. In the cavities 111a, 111b adjacent the wall unit, air envelopes 97 are suspended and are connected with the wall unit by a pipe 97a. The wall unit, which is filled with dry air, is thus always without pressure. Furthermore, in the cavities, connections are provided in the upper region for pipes 133 and in the lower region for the pipes 137 of an air conditioning installation in accordance with FIG. 6. The closed installation is filled with dried air. If for example the space adjacent the right hand plaster plate 16e is not heated, then heat flow through the left hand plaster plate 16d and through the wall unit towards the right hand plaster plate 16e. The amount of heat per unit of time is small, due to the heavy damping action of the wall unit, and can easily be compensated by a flow of warm air from the air conditioning installation, through the left hand cavity 111a. Thus, the left hand plaster plate or wall can always be kept at a desired temperature. The circulation pump and the heating and cooling device can be automatically controlled by thermostats.

With external walls such as shown in FIG. 1, which comprise a cavity 96 on the building side, the upper pipe 98 may be connected to the line 133 and a lower pipe (not illustrated) may be connected to the line 137 of the air conditioning installation. The small amount of cold or heat passing through the wall unit can thus be compensated and the wall or plaster plate 16 or the building, can be kept at the desired temperature.

A number of examples of construction of the wall units, their panels and the insulation lying therebetween, will now be described.

Figure 17:
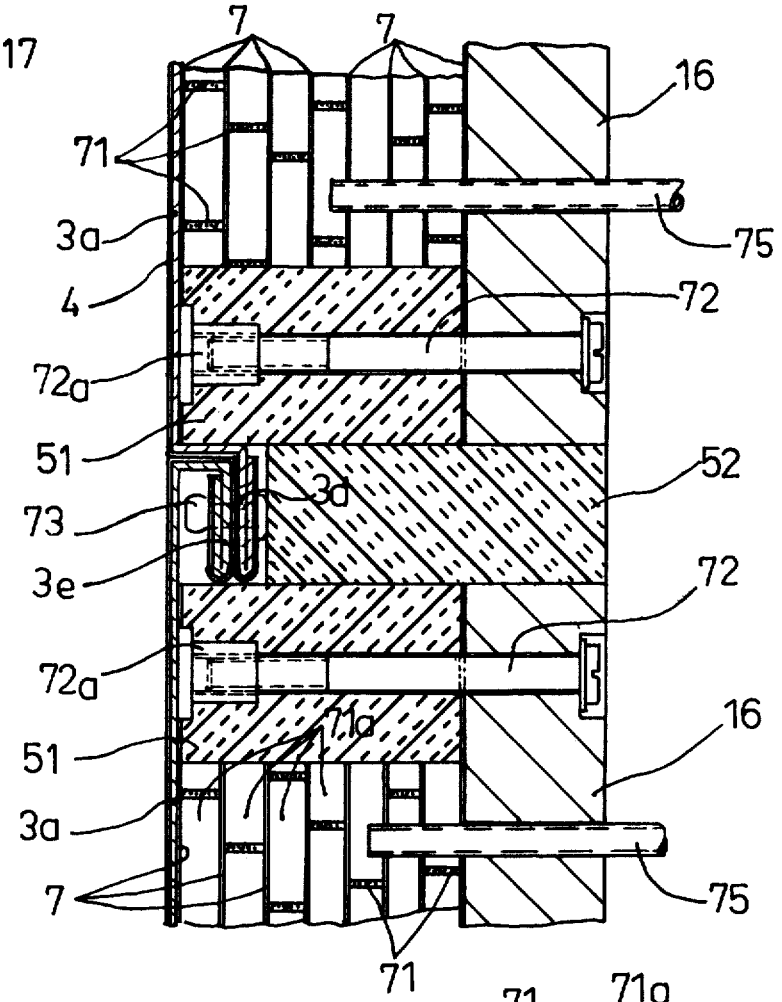
FIGS. 17 and 18 illustrate a wall element with insulating reflecting foils and with spacing members formed by perforated hard plastics foam plates, respectively in partial cross-section and partial elevation.
Figure 18:
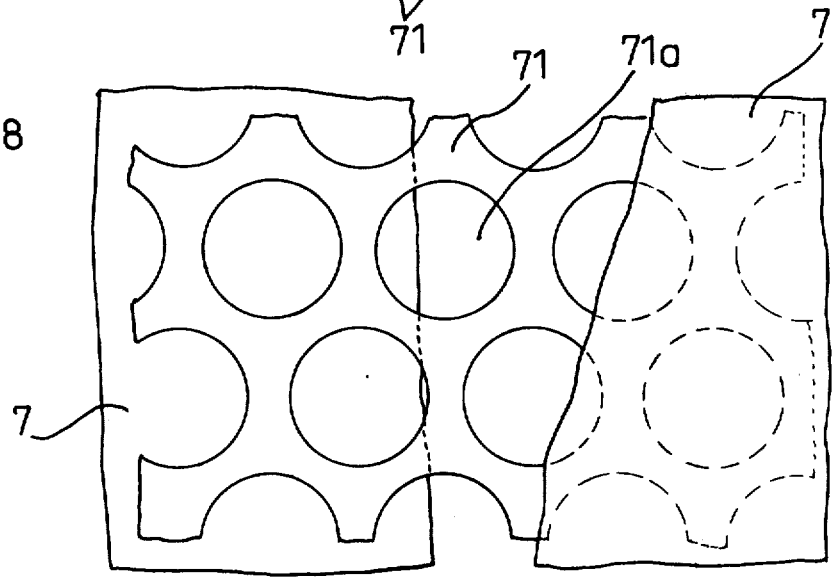

In FIG. 17, an example of a suitable wall unit is illustrated in longitudinal section. Seven insulating groups with insulating foam plates 71 lie against the other sheet metal panel 3a, which has an outer layer 4. As shown in FIG. 18, the insulating foam plates have cylindrical perforations 71a. The perforations are tightly closed on both sides by reflecting foils 7, which form narrow insulating chambers containing stationary air. In order to reduce the contact and accordingly reduce the heat conduction, it is advantageous for the surfaces of the insulating plates to be roughened. Towards the inner side of the cavity, the wall unit is closed by a plaster plate 16 which is clad, towards the last insulating group, with a reflecting foil 7. The marginal sealing of the wall unit is effected by insulating strips 51, for example of solid foam. The outer wall panel 3a and the plaster plate 16 are connected through the insulating strips, by means of plastics screws 72. For this purpose, on the inner side of the wall panel 3a, a nut 72a is welded by the stud welding method. For connecting an upper and a lower wall unit, the sheet metal panel margins are provided with angled portions, the lower panel having the U-shaped angle formation 3e and the upper panel having the L-shaped angle formation 3d. The mutually engaging angle formations are connected by rivets 73. After fixing, an insulating margin filling strip 52 is pushed into the open gap between the upper and lower wall units. In this example, the sheet metal panels are mutually supported and can withstand pressure.

The insulation can be increased by evacuation of the cavity between the sheet metal panels. For this purpose, the individual wall units may be provided with valves and/or all wall units may be connected through a pipe with a common evacuating installation. The evacuation excludes heat transmission by convection. Moreover, formation of condensed water is prevented, which would reduce the reflection capability of the highly polished reflecting foils.

For avoiding pressure differences, hoses or pipes 75 may extend through the plaster plate 16 into the interior of the wall unit, which connect the cavity of the airtight wall unit with the atmosphere, through an air drying installation, or connect it with a volume compensating device.

Figure 19:
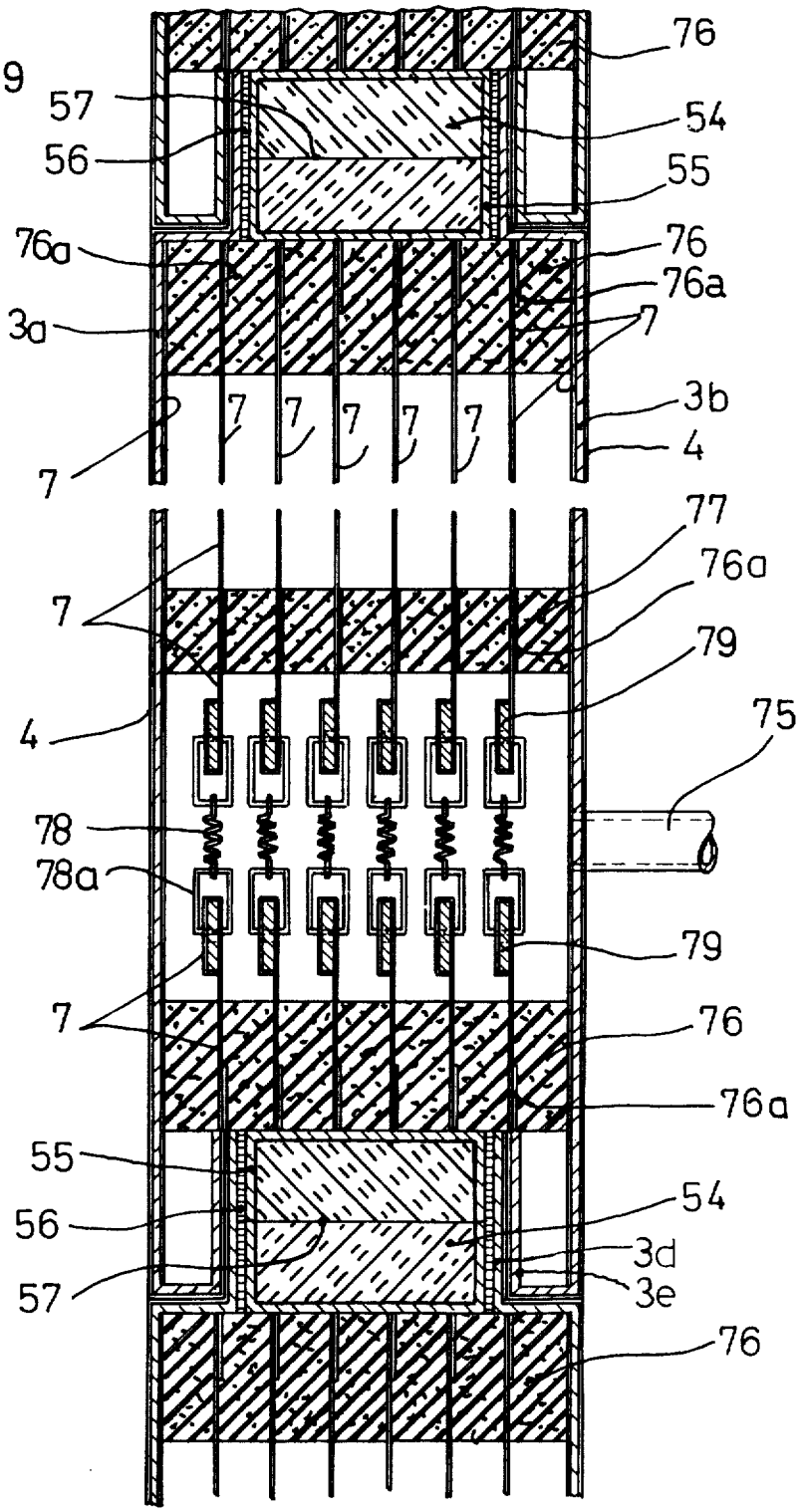
FIG. 19 is a vertical sectional view of a wall element having insulating reflecting foils tensioned by means of springs.
Figure 20:
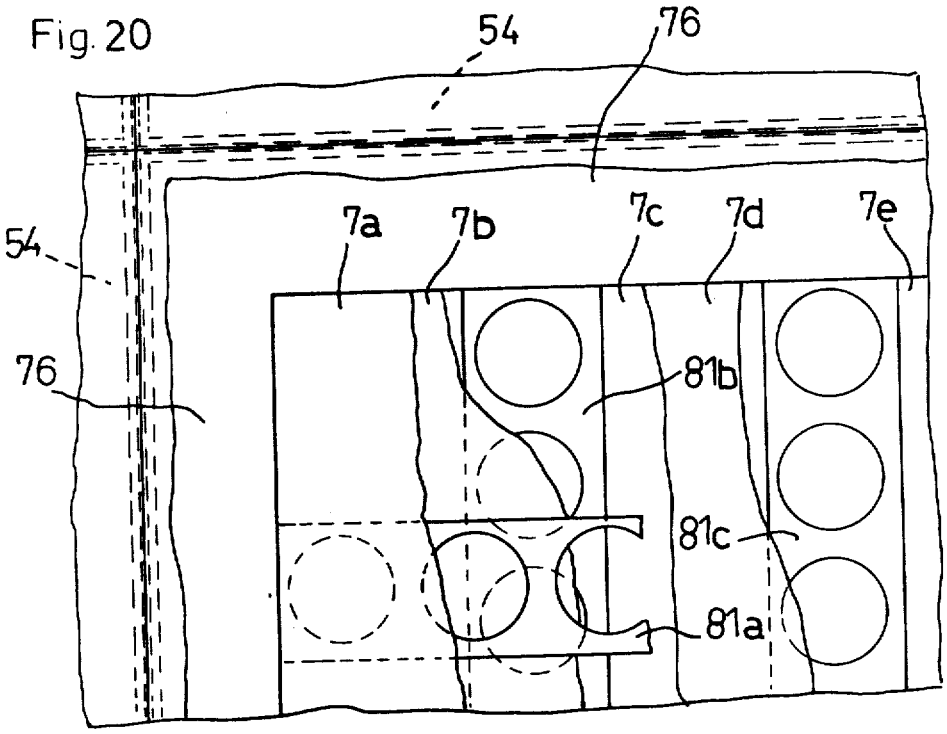
FIG. 20 is a partial elevation of a wall unit having reflecting foils and spacing members consisting of perforated hard plastics foam strips, the panels and a number of other parts being broken away.

The example of FIG. 19 enables a still smaller use of insulating material. The outer panel 3a and the inner panel 3b are covered on the outside with a coating 4 and are internally clad with a reflecting foil 7. In the cavity, further reflecting foils are mounted under tension, for example at spacings of only a few millimeters, preferably five to ten millimeters. For this purpose, the upper margins of the foil are fixed onto fixing strips 76, preferably of hard foam, for example by an adhesive coating 76a, and the fixing strips together with the foils are inserted into the panels and substantially airtightly connected between themselves and with the panels. The lower margins of the foils are rolled around metal strips 76 and simultaneously bonded. The metal strips have poles for the provision of links 78a which can be suspended on springs 78. In a mirror symmetrical arrangement, the other ends of the springs are secured through metal strips onto foils the other ends of which are held by fixing strips between the panels. The foils may be provided with spacing strips 77 above the metal strips, which are held on only one side by an adhesive coating 76a, the other side simply lying in free contact and allowing the passage of air. The panels are provided at the upper margins with L-shaped angled portions 3a and at the lower margin with U-shaped angled portions 3f, so that abutting wall units can be pushed one in the other in a tongue and groove-like manner. The cavity between the angled portions 3e is closed off by marginal strips 54 of hard plastics foam. For reinforcing, the marginal strips may be surrounded by a rectangular tube of plastics material and the tube can be airtightly incorporated, with the aid of rubber strips 56. For complete air closure, the rectangular tube and the strips may be horizontally subdivided and stuck together again with the interposition of a metal foil 57 as a vapour barrier. Into the intermediate space between the lower fixing strips 76 and the spacing strips 77, a pipe 75 for example of plastics material extends, the pipe being connected through a pipe network to the atmosphere through an air drying installation, or being connected to a compensating device. Instead of the cavities in the wall units, and the circulatory system being filled with air, other dry gases, for example nitrogen may be used. This has the advantage that the surfaces of the aluminum foils are not oxidised.

Figure 21:
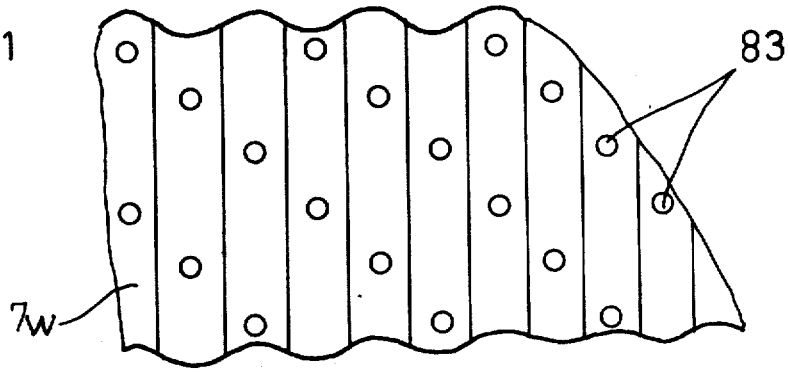
FIG. 21 is a partial elevation of a corrugated reflecting foil with spacing studs.

In accordance with the front elevation shown in in FIG. 11, reflecting foils 7 may be held on all margins by fixing strips 76. The cavity between the two foils is sub-divided into chambers by perforated insulating strips 81. By showing individual foils cut away, the chambers between the foils 7a and 7b, formed by horizontal insulating strips 81a, and the cavity between the foils 7b and 7c, formed by the vertical insulating strips 81b and so on, can be seen. Profiled reflecting foils 7w can be very simply provided in the wall unit. For this purpose, the foil is embossed so that in cross-section it has a corrugated shape as shown in FIG. 21, or a trapezoidal shape. Despite its small thickness of 0.005 to 0.015 mm, the foil can be arranged freestanding or may be suspended. The spacing means for the foils, may be in the form of cylindrical studs 83 of plastics foam, which are bonded onto the foil.

A very convenient embodiment is shown in elevation in FIG. 22 and in cross-section in FIG. 23. An outer sheet metal panel 3a with a coating 4, is internally clad with a reflecting foil 7, just as in the embodiment of FIG. 1. For fire protection, the foil 7 is followed by a perforated asbestos plate 107a, and then by a reflecting foil 7a, a non-perforated asbestos plate 107b, a reflecting foil 7b, then a spacing band 105 for example of plastics or fire resistant material such as glass fibre, asbestos or the like and thereafter a corrugated aluminum reflecting foil 7w and further spacing bands and corrugated foils. The surfaces of the bands are disposed perpendicularly to the vertical faces of the foils and wall regions. The bands are guided in a zigzag manner over studs 106 which are welded onto the inside of the outer panel 3a at suitable spacings along its vertical margins. In order to prevent slipping of the bands on the studs, spacing rings 108 are inserted on the studs between the individual bands.

In the arrangement shown in FIG. 24, for saving space, flat reflecting foils 7 can be used which have cords 101 of plastics material arranged on both sides, the cords being tensioned by springs and held at suitable spacings by spacing rings 102.

In another simple embodiment shown in FIGS. 25 and 26, corrugated reflecting foils 7 are held by spacing strips 165. The spacing strips are of rectangular cross-section with ribs 165a provided at two oppositely disposed corners, the ribs engaging the foils only in point-like manner. The spacing members are inserted with their ends in openings 167 of receiving walls 166 which lie against the narrow vertical sides of the wall unit, at the inside.

FIG. 27 illustrates a further embodiment of a wall unit with a closed insulating element which can be inserted in it. An outer panel 3a and an inner panel 3b are clad on their inner sides with reflecting foil 7 and are connected together by marginal strips which consist of rectangular plastics tubes 55 with insulation 54 embedded in them, the connections between the panels and the marginal strips being effected by screws and by welded on nuts which are not illustrated. Adjacent each panel there is provided a perforated honeycomb plate 71. The cavity remaining between the honeycomb plates is filled with an insulating element 170 which can be inserted. The insulating element consists of two aluminum plates 170a and 170b which are reflective on both sides, and a flexible airtight and vapourtight plastics foil 171 which is guided around the margins of the spaced apart plates.

Instead of being composed of plates and foil, the insulating element may be made from plastics material which is reflectingly metallised on both sides. Inside the insulating element, insulating means such as reflective foils and spacing means suiting the particular requirements are provided. The insulating element may be airtightly closed and so arranged that it has a pressure above atmospheric pressure or an average atmospheric pressure or a pressure below atmospheric pressure, or it may be evacuated. Alternatively, the insulating element may be included in a circulatory system for dry air, by means of appropriate valves and pipe connections. The plastics foils may be welded together in a plurality of layers or may be arranged one on the other in layers, aluminum powder being vaporised onto their intermediate and external surfaces for metallising the surfaces and thus making them generally reflective, or reflective aluminum foils being interposed and welded on. Thus, it is possible to make the walls of the closed insertable insulating element highly reflective and to close them off in an air and vapour tight manner relative to the outer wall unit. Vertical air channels 111a, 111b may be arranged in the honeycomb plates.

For reducing the volume of the air which has to be maintained in a dry condition, variable volume insulating elements which are themselves closed, may be inserted in the cavity of the wall unit as shown in FIG. 28. The wall unit comprises an outer panel 3a and an inner panel 3b which are airtightly connected together by marginal strips consisting of rectangular plastics tubes 55 with embedded insulating strips 54, and by means of screws and welded on nuts, which are not illustrated. The panels are internally clad with reflecting foils 7 and a honeycomb plate 71 for each panel. In the cavity lying between them, a variable volume insulating element 170 which is itself closed, is inserted. This element consists of an outer aluminum plate 170a and an inner aluminum plate 170b which are arranged parallel to the wall panels 3a and 3b, these plates having reflecting surfaces on both sides and extending over substantially the whole area of the cavity. The two spaced apart plates are surrounded by a plastics envelope 171 which is formed with bellows-like folds. The insulating element can expand or contract within the cavity. To enable this, the aluminum plates are suspended by eyelets on rods 172 which are fixed onto the panels. The insulating elements is filled with dry air to an extent of approximately 80% at 20° C., so that it can expand without pressure, up to the maximum occurring temperature. Between the insulating element and the panels, air gaps 111a and 111b are provided for circulation of the dry air.

In the above described insulating element, a frame may be inserted having reflecting foils arranged at a spacing, as illustrated in FIG. 29. The frame 173 consists of two frames 173a which are held together by a cover 173b, a base 173c and struts 173d. On the inner side of the cover, spacing members 174 are provided, with a series of holes 174a for pushing pins 175 through. At their upper margin, the reflecting foils carry fixing strips of insulating material which have holes through which the pins can likewise be inserted for their suspension. At the lower margins, reinforcing strips 79 are provided, with holes 79a in which springs 78 fixed on the base of the frame can be secured for tensioning the reflecting foils. Also, spacing bands or cords may be mounted under tension between the individual reflecting foils, and looped around the struts in a zigzag manner.

FIG. 30 shows another embodiment of an insertable variable volume insulating element, in vertical section. Between the ceiling 121 and the floor, a lefthand wall 16d and a right hand wall 16e are arranged at a spacing and are clad on their inner sides with reflecting foil 7. Below the ceiling, a rod 172 is fixed on the walls, onto which the insulating element 177 is suspended by means of eyelets. The insulating element consists of reflectingly metallised plastics material fabricated into a box-shape and filled with dry air, and has an open compartment at the top and bottom for the reception of flexible airtight volume compensating envelopes 178. The envelopes are connected with the box-shaped insulating element by pipes 179. Between the walls and the insulating element, the air gaps 111a and 111b remain, for the circulation of dry or conditioned air.

As reflecting foils, more particularly foils of aluminum are suitable. The thinner these foils are, the lower is their heat capacity. The use of thin foils of only about 5 to 15 mm thickness causes difficulty however due to the ease with which they can be torn at their margins.

In an embodiment of the invention, the marginal regions are reinforced in the longitudinal direction by narrow adhesive strips which are resistant to ageing, preferably of plastics or in the form of heavy aluminum foil. The marginal regions in the longitudinal and transverse direction may also be provided with stiffening strips which facilitate the tensioning of foils by spring means. These strips may be connected together to form rigid rectangular frames, and stuck into the folded over marginal regions of the aluminum foils, which preferably are previously provided with adhesive strips.

Figure 31:
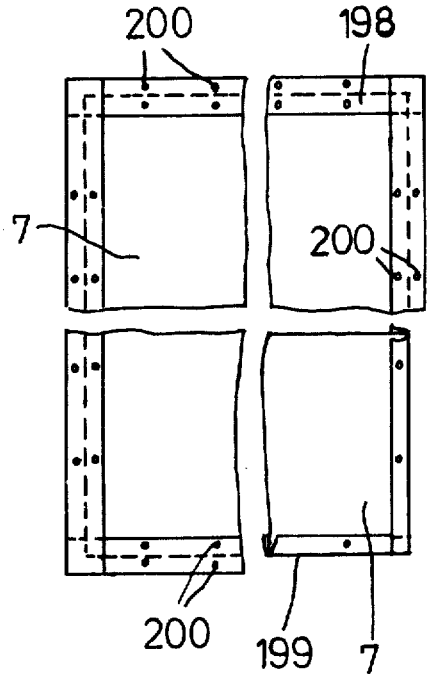
FIG. 31 is an elevation view of a reflecting foil having marginal reinforcements.

FIG. 31 shows an aluminum foil 7 in plan view, the longitudinal and transverse margins of which are strengthened and reinforced with adhesive strips 198, for example constituted by plastics or heavier aluminum foil. The adhesive strips may be folded at their centre 199 as shown at the lower right hand side of FIG. 31, and may receive strips or frame members in the folded over region. The fixing may advantageously be effected by adhesive or by rivets 200. These may be in the form of hollow rivets and serve also the for arrangement of resilient tensioning means.

Figure 32:
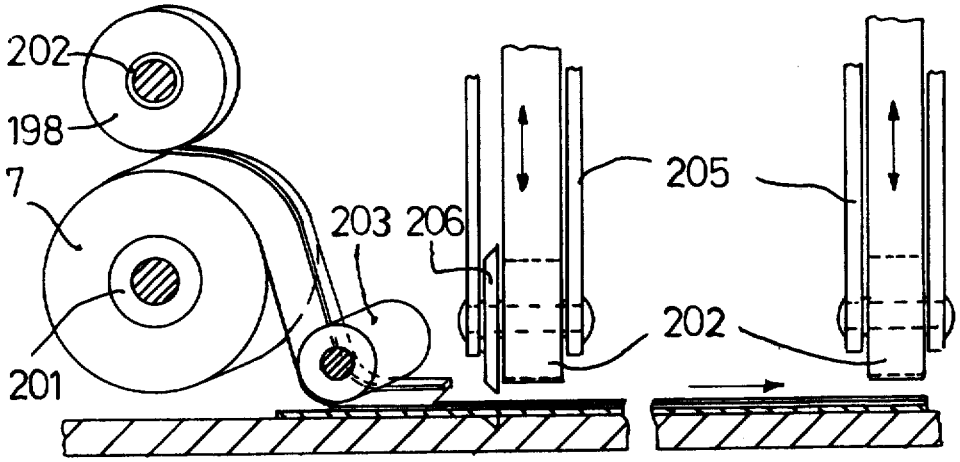
FIG. 32 diagrammatically illustrates the application of adhesive strips to the longitudinal and transverse margins of the reflecting foil.

FIG. 32 diagrammatically illustrates a device comprising a roller 201 with a rolled up aluminum foil 7 and above this roller on both longitudinal margins of the foil, rolls 202 of adhesive strip and guide rolls 203 are provided, with the aid of which the longitudinal marginal regions of the foils are adhesively secured to the strips. At the free transverse margin, the foil is engaged by a suction bar operated by a vacuum, and is drawn out to the desired length from the roller 201. For performing the bonding in the transverse direction, adhesive applying rolls 204 are provided which are movable in the direction transversely of the foil on guides 205, and cutting wheels 206, by means of which the foil drawn from the rolls 201 is cut to the desired length. The rolls 203 and the cutting wheels 206 can be lifted clear.

I claim:

1. An assembly of wall units for providing thermal and acoustic insulation, each of said wall units comprising at least one outer panel and one inner panel connected to the outer panel, said panels forming a cavity therebetween, the cavity being air-tightly closed, shaped insulating and spacing means disposed in the cavity, said insulating and spacing means being formed of relatively stiff material so as to transversely rigidify the wall unit between said outer and inner panels, means for circulating a dry gas through said wall units, said means comprising a gas supply line communicating with each of said cavities, said supply lines being connected to a common supply line for supplying gas to all of said cavities, a gas take-off line in each cavity spaced from said supply line, said take-off lines being connected to a common take-off line for removing gas simultaneously from said cavities, a volume compensating device for controlling the volume of gas in said wall units, and pump means for recirculating the gas from said take-off lines to said supply lines.

2. The wall unit of claim 1 in which each cavity is airtightly connected with a flexible airtight envelope.

3. The wall unit of claim 1 in which an air dryer and a dust filter are connected with the cavities of the wall units through said common take-off line.

4. The wall unit of claim 1 further including a heating device and a cooling device provided in the path of circulation of the gas.

5. The wall unit of claim 1 in which a second pressure pump is provided in the circulation path of the gas, valve means for controlling flow to said pump for maintaining an above-atmospheric pressure in the cavities, and a pressure vessel located downstream of said pressure pump.

6. The wall unit of claim 5 in which the dry gas is dry air, and the means for supplying additional dry gas to the wall unit comprises an inlet connected to the atmosphere.

7. The wall unit of claim 1 in which the shaped insulating and spacing means are covered on at least one surface thereof with a heat reflecting foil.

8. The wall unit of claim 1 in which the means for circulating the dry gas through the cavity further includes dust filtering means, drying means, and heating and cooling means.

9. The wall unit of claim 1 in which the spacing means are perforated foam plastic plates arranged within said cavity.

10. The wall unit of claim 1 further including reflecting foils positioned outwardly of said insulating and spacing means, said spacing means subdividing the cavity between the reflecting foils into chambers by a number of narrow perforating strips of hard foam plastics.

11. The wall unit of claim 1 in which the spacing means are insulating foam plates with cylindrical perforations.

12. The wall unit of claim 1 in which the spacing means are corrugated foils and spacing strips of foam plastic filling up the cavity and stiffening the wall unit.

* * * * *